(12) United States Patent
Paleczek et al.

(10) Patent No.: US 12,533,925 B2
(45) Date of Patent: Jan. 27, 2026

(54) MOTOR VEHICLE

(71) Applicant: Dr. Ing. h.c. F. Porsche Aktiengesellschaft, Stuttgart (DE)

(72) Inventors: Josef Paleczek, Tiefenbronn (DE); Jafar Khanlarov, Baden-Baden (DE); Andreas Munzert, Gerlingen (DE); Patrick Königstein, Ditzingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 51 days.

(21) Appl. No.: 18/582,727

(22) Filed: Feb. 21, 2024

(65) Prior Publication Data
US 2024/0336104 A1   Oct. 10, 2024

(30) Foreign Application Priority Data

Apr. 6, 2023 (DE) .......................... 102023108871.8

(51) Int. Cl.
| | |
|---|---|
| *B60G 17/056* | (2006.01) |
| *B60G 17/0195* | (2006.01) |
| *B60G 17/08* | (2006.01) |
| *B62D 5/04* | (2006.01) |

(52) U.S. Cl.
CPC ....... *B60G 17/056* (2013.01); *B60G 17/0195* (2013.01); *B60G 17/08* (2013.01); *B62D 5/0427* (2013.01); *B60G 2204/20* (2013.01)

(58) Field of Classification Search
CPC .. B60G 17/056; B60G 17/0195; B60G 17/08; B60G 2204/20; B62D 5/0427
See application file for complete search history.

(56) References Cited

U.S. PATENT DOCUMENTS

| | | | | |
|---|---|---|---|---|
| 3,528,678 A | * | 9/1970 | Moulton ................ | B62D 31/02 280/798 |
| 4,566,718 A | * | 1/1986 | Kanai ..................... | B62D 6/06 74/498 |
| 4,573,705 A | * | 3/1986 | Kanai ..................... | B62D 9/00 280/5.521 |

(Continued)

FOREIGN PATENT DOCUMENTS

| | | |
|---|---|---|
| DE | 102004039973 A1 | 3/2005 |
| DE | 102017123570 A1 | 4/2019 |

OTHER PUBLICATIONS

Search Report dated Sep. 22, 2023, by the German Patent Office for Application No. 10 2023 108 871.8.

*Primary Examiner* — Phutthiwat Wongwian
*Assistant Examiner* — Susan E Scharpf
(74) *Attorney, Agent, or Firm* — Buchanan Ingersoll & Rooney PC

(57) ABSTRACT

A motor vehicle includes two vehicle wheels, which are arranged on a common vehicle axis, and two single wheel suspension devices of an active chassis, via which the vehicle wheels are each connected to an engine vehicle body. The single wheel suspension devices each have a shock damper, which can be fluidically connected to an engine pump unit to vary the damping behavior. The engine pump unit is arranged in the area of the common vehicle axis. The engine pump unit and a further device arranged in the area of the vehicle axis are arranged off-center in the vehicle transverse direction. The engine pump unit is arranged spaced apart from the further device in the vehicle transverse direction.

12 Claims, 1 Drawing Sheet

(56) References Cited

U.S. PATENT DOCUMENTS

| | | | | |
|---|---|---|---|---|
| 5,269,556 | A | * | 12/1993 | Heyring ................. B60G 11/26 280/5.513 |
| 6,805,204 | B2 | * | 10/2004 | Bauer .................... E01H 12/00 404/124 |
| 2002/0129696 | A1 | * | 9/2002 | Pek ........................ F41A 23/34 89/40.01 |
| 2009/0127812 | A1 | * | 5/2009 | Copsey ................... B60G 9/02 280/124.128 |
| 2012/0234638 | A1 | * | 9/2012 | Ellifson .............. B60G 21/067 188/266 |
| 2023/0256787 | A1 | * | 8/2023 | Jefferies .............. B60G 15/061 280/6.152 |

\* cited by examiner

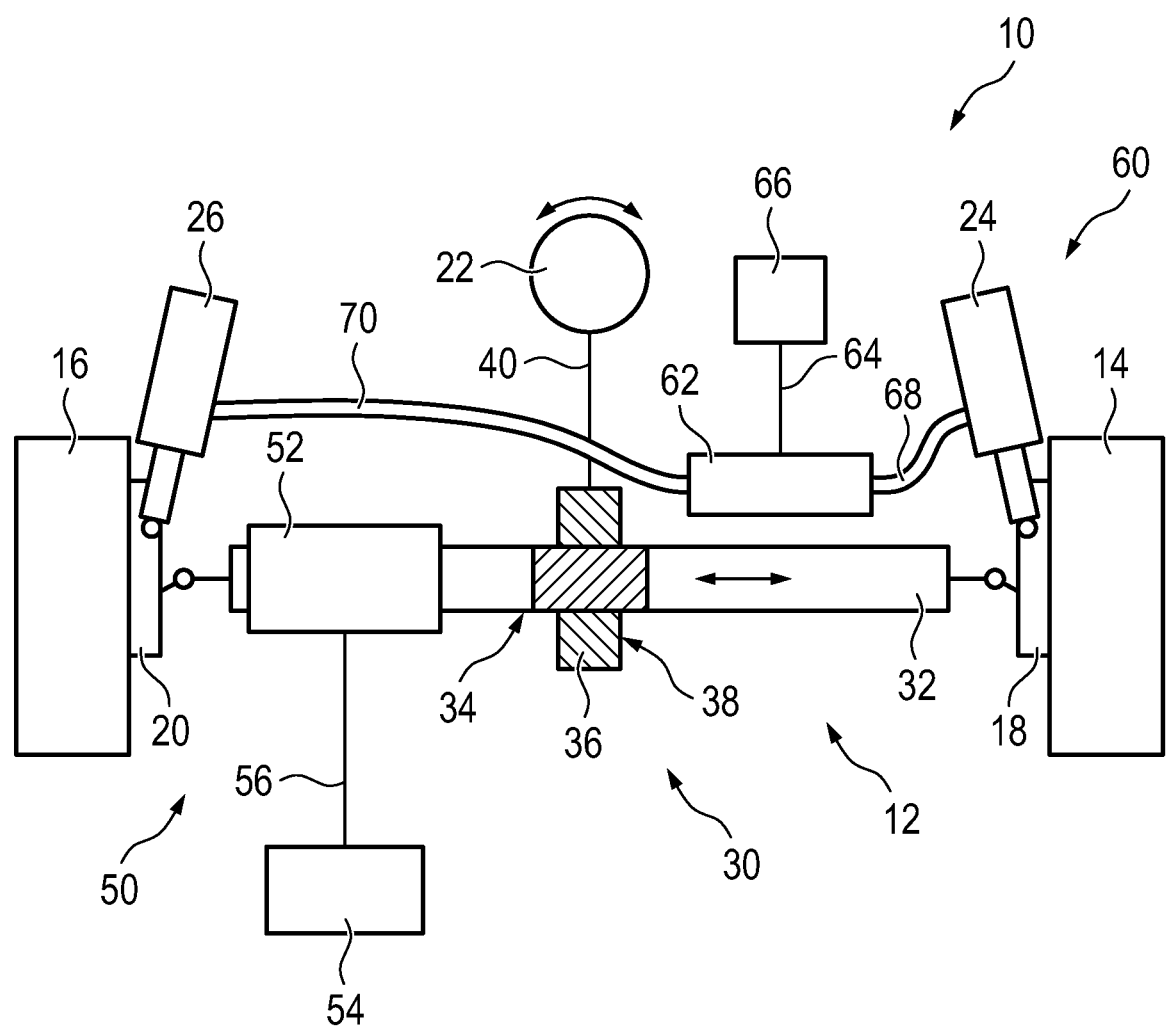

MOTOR VEHICLE

CROSS-REFERENCE TO RELATED APPLICATION

This application claims priority to German Patent Application No. 10 2023 108 871.8, filed Apr. 6, 2023, the content of such application being incorporated by reference herein in its entirety.

FIELD OF THE INVENTION

The invention relates to a motor vehicle having two vehicle wheels, which are arranged on a common vehicle axis, two single wheel suspension devices of an active chassis, via which the vehicle wheels are each connected to a motor vehicle body, wherein the single wheel suspension devices each have a shock damper, which can be fluidically connected to an engine pump unit to vary the damping behavior, wherein the engine pump unit is arranged in the area of the common vehicle axis.

BACKGROUND OF THE INVENTION

Such active chassis are generally known from the prior art, wherein a hydraulic variation caused by the engine pump unit can be used to adjust the damping behavior of the shock dampers. Typically, the engine pump unit is arranged in the area of a vehicle axis, i.e., in the area of the front axis or the rear axis, and is attached to a vehicle body. The fluidic connection between the engine pump unit and the shock dampers is typically realized via flexible hose lines.

In the area of the vehicle axis, i.e. in the area between the two vehicle wheels or between the two shock dampers, further devices of the motor vehicle are typically arranged, wherein the available design space in the area of the vehicle axis is very limited. In addition, an unfavorable arrangement of the engine pump unit and the other devices results in an undesirable off-center center of mass.

SUMMARY OF THE INVENTION

Described herein is a motor vehicle in which the engine pump unit and the further devices are arranged in a design space-optimized manner and the center of mass is arranged as centrally as possible.

By having the engine pump unit and a further device arranged in the area of the vehicle axis arranged off-center in the vehicle transverse direction, wherein the engine pump unit is spaced apart from the further device in the vehicle transverse direction, the engine pump unit and the further device are arranged next to each other in the vehicle transverse direction. As a result, the design space in the area of the vehicle axis, i.e. between the vehicle wheels of a common vehicle axis, can be utilized in the best possible way and the center of mass in the vehicle transverse direction can be shifted to the center of the vehicle.

Preferably, the engine pump unit and the device are arranged flush to each other in the vehicle vertical direction, thereby requiring a relatively small design space in the vehicle vertical direction for the device and the engine pump unit.

In a preferred configuration, the engine pump unit and the further device are arranged spaced apart from each other in the vehicle longitudinal direction, whereby the center of mass is arranged centrally in the vehicle transverse direction and yet the engine pump unit is easily accessible in a simple manner, for example in a repair-related disassembly.

In a particularly preferred configuration, the device is an electric steering assist device. A steering assist device is an integral part of a steering device. For example, the steering assist device is configured as an electric steering assist unit and comprises a housing in which an electric motor is arranged. The steering assist device is operatively connected to the steering gear, whereby the steering assist device is controlled as a function of the steering movement performed by the steering wheel, thereby assisting the manual steering movement using the steering assist device.

BRIEF DESCRIPTION OF THE DRAWINGS

An exemplary embodiment of the invention is explained in further detail with reference to the drawing.

FIG. 1 schematically shows a motor vehicle.

DETAILED DESCRIPTION OF THE INVENTION

FIG. 1 shows a motor vehicle 10 having a vehicle axis 12 and two vehicle wheels 14, 16 arranged on the common vehicle axis 12. Each vehicle wheel 14, 16 is connected to a motor vehicle body (not shown in the FIGURE) via a single wheel suspension device 18, 20 of an active chassis. The single wheel suspension devices 18, 20 each comprise a shock damper 24, 26, which are mounted on the one hand on a wheel carrier of a vehicle wheel 14, 16, and on the other hand on the motor vehicle body.

The dampers 24, 26 are arranged such that the damping behavior of the shock dampers 24, 26 can be specifically adjusted. An engine pump unit 62 is provided for this purpose, which is fluidically connected to the shock dampers 24, 26 via a hydraulic line 68, 70 in each case. To control the engine pump unit 62, it is connected to a control unit 66 via a line 64. The engine pump unit 62 can be used to specifically change the pressure of a hydraulic fluid in the damper volume of the shock dampers 24, 26.

The motor vehicle 10 also comprises a further device on the vehicle axis 12, namely a steering device 30, which is centrally arranged in the area of the vehicle axis 12, i.e. between the vehicle wheels 14, 16 or between the shock dampers 24, 26. The steering device 30 comprises a rack and gearwheel combination 34, which has a rack 32 with a toothing 34 and a gearwheel 36 with a toothing 38 corresponding to the toothing 34. The rack 32 is slidably mounted and connected to the vehicle wheels 14, 16 such that a steering movement of the vehicle wheels 14, 16 is triggered by a displacement of the rack 32 in the vehicle transverse direction. The gearwheel 36 is connected to a steering wheel 22 via a steering shaft 40.

In travel mode and during a steering operation, the steering wheel 22 is moved by a person, wherein the steering movement of the steering wheel 22 is transferred via the steering shaft 40 to the gearwheel 36 and the latter rotates. Due to the rotation of the gearwheel 36 and the tooth engagement between the toothing 38 of gearwheel 36 and the toothing 34 of rack 32, the rack 32 moves translationally in the vehicle transverse direction and causes a steering movement of the vehicle wheels 14, 16.

The motor vehicle 10 further comprises a steering assist device 50, which is arranged in the area of the vehicle axis 12. The steering assist device 50 comprises an electric assist unit 52 that is mechanically operatively connected to the rack 32 and connected to a control unit 54 via a line 56.

The steering assist device 50 is used for assisting the steering movement of the vehicle wheels 14, 16 when the steering wheel 22 moves. The movement of the steering wheel 22, steering shaft 40, gearwheel 36, or rack 32 is detected by a sensor (not shown) and, based thereon, the steering assist unit 52 is controlled by the control unit 54. In so doing, the steering assist unit 52 additionally drives the rack 32, thereby assisting the rotation of the vehicle wheels 14, 16.

According to the present invention, the engine pump unit 62 and the steering assist device 50, i.e., the steering assist unit 52, are arranged off-center and spaced apart from each other in the vehicle transverse direction. In other words, the engine pump unit 62 is arranged in the vehicle transverse direction next to the steering assist device 50. In this case, the engine pump unit 62 and the steering assist device 50 are positioned in the vehicle transverse direction such that the center of mass is centered in the vehicle transverse direction. Preferably, the engine pump unit 62 and the steering assist device 50 are flush to each other in the vehicle vertical direction and spaced apart from each other in the vehicle longitudinal direction.

The design space available in the area of the vehicle axis 12 can thus be optimally utilized and the center of mass can be shifted in the vehicle transverse direction to the center.

What is claimed is:

1. A motor vehicle comprising:
   two vehicle wheels arranged on a common vehicle axis; and
   two single wheel suspension devices of an active chassis, via which the vehicle wheels are each connected to a vehicle body,
   wherein the single wheel suspension devices each have a shock damper, which is configured to be fluidically connected to an engine pump unit to vary the damping behavior,
   wherein the engine pump unit is arranged beside the common vehicle axis,
   wherein the engine pump unit and a further device arranged beside the vehicle axis are arranged off-center in a vehicle transverse direction, and
   wherein the engine pump unit is spaced apart from the further device in the vehicle transverse direction.

2. The motor vehicle according to claim 1, wherein the engine pump unit and the further device are arranged off-center in the vehicle transverse direction, such that a center of mass is arranged centrally in the vehicle transverse direction.

3. The motor vehicle according to claim 1, wherein the engine pump unit and the further device are arranged in the vehicle vertical direction flush to each other.

4. The motor vehicle according to claim 1, wherein the engine pump unit and the device are arranged spaced apart from each other in the vehicle longitudinal direction.

5. The motor vehicle according to claim 1, wherein the further device is a steering assist device.

6. The motor vehicle according to claim 1, wherein each shock damper is fluidically connected to the engine pump unit.

7. The motor vehicle according to claim 1, wherein said further device is an electric steering assistance unit.

8. The motor vehicle according to claim 7, wherein the pump unit and the electric steering assistance unit are positioned on different sides of a vehicle longitudinal axis that is defined along a travel axis of the vehicle.

9. The motor vehicle according to claim 7, wherein the electric steering assistance unit comprises a control unit and a steering assistance unit that is electrically connected with the control unit, wherein the steering assistance unit is operatively connected to a rack of a steering system of the motor vehicle.

10. The motor vehicle according to claim 9, wherein the rack includes a toothing and a gear wheel having a mating toothing that is mated with the toothing of the rack, and wherein the gear wheel is connected to a steering wheel of the vehicle via a steering shaft such that rotation of the steering wheel causes rotation of the gear wheel which causes translation of the rack which causes a steering movement of the motor vehicle.

11. The motor vehicle according to claim 9, wherein the pump unit is positioned at an elevation above the rack and the steering assistance unit is positioned on the rack.

12. The motor vehicle according to claim 11, wherein the pump unit and the steering assistance unit are positioned on different sides of a vehicle longitudinal axis that is defined along a travel axis of the vehicle.

* * * * *